United States Patent [19]
Haselton et al.

[11] Patent Number: 4,900,188
[45] Date of Patent: Feb. 13, 1990

[54] DEVICE FOR LOCAL REDUCTION OF WAVE AMPLITUDE

[76] Inventors: Thomas Haselton, Christiansholmsvej 39, DK-2930 Kampenborg, Denmark; Frederick R. Haselton, 1025 N. Maple Ave., Cookeville, Tenn. 38501

[21] Appl. No.: 341,387

[22] Filed: Apr. 21, 1989

[51] Int. Cl.$^4$ ............................................. E02B 3/06
[52] U.S. Cl. ...................................... 405/27; 405/21; 405/26; 405/28
[58] Field of Search ..................... 405/21, 23, 25, 26, 405/27, 28, 30, 33, 35

[56] References Cited

U.S. PATENT DOCUMENTS

| | | | |
|---|---|---|---|
| 3,011,316 | 12/1961 | Wilson | 405/28 |
| 3,218,809 | 11/1965 | Rhodes et al. | 405/27 |
| 3,969,901 | 7/1976 | Matsudaira et al. | 405/26 X |
| 3,986,471 | 10/1976 | Haselton | 114/265 |
| 4,006,598 | 2/1977 | Hulsemann | 405/25 |
| 4,130,994 | 12/1978 | Van Moss, Jr. | 405/27 X |
| 4,234,266 | 11/1980 | Angioletti | 405/26 |
| 4,341,489 | 7/1982 | Karnas | 405/33 X |
| 4,715,744 | 12/1987 | Richey | 405/26 |

FOREIGN PATENT DOCUMENTS

| | | | |
|---|---|---|---|
| 3535104 | 4/1987 | Fed. Rep. of Germany | 405/27 |
| 22808 | 3/1981 | Japan | 405/26 |

*Primary Examiner*—Dennis L. Taylor
*Assistant Examiner*—J. Russell McBee
*Attorney, Agent, or Firm*—Pollock, Vande Sande & Priddy

[57] ABSTRACT

A device for effecting local reduction of sea wave amplitude includes a grid plate adapted to be supported in the sea at a predetermined depth ensuring that the grid plate remains submerged below the trough of the highest wave expected to be encountered in use of the wave reduction device. The grid plate member includes a plurality of interconnected elongate supporting members hingedly supporting flapper valve plates which are operable between substantially opened and closed positions, each flapper walve in its opened position permitting sea water to flow substantially unimpeded through the flapper valve and in its closed position substantially blocking the flow of sea water through the flapper valve.

18 Claims, 5 Drawing Sheets

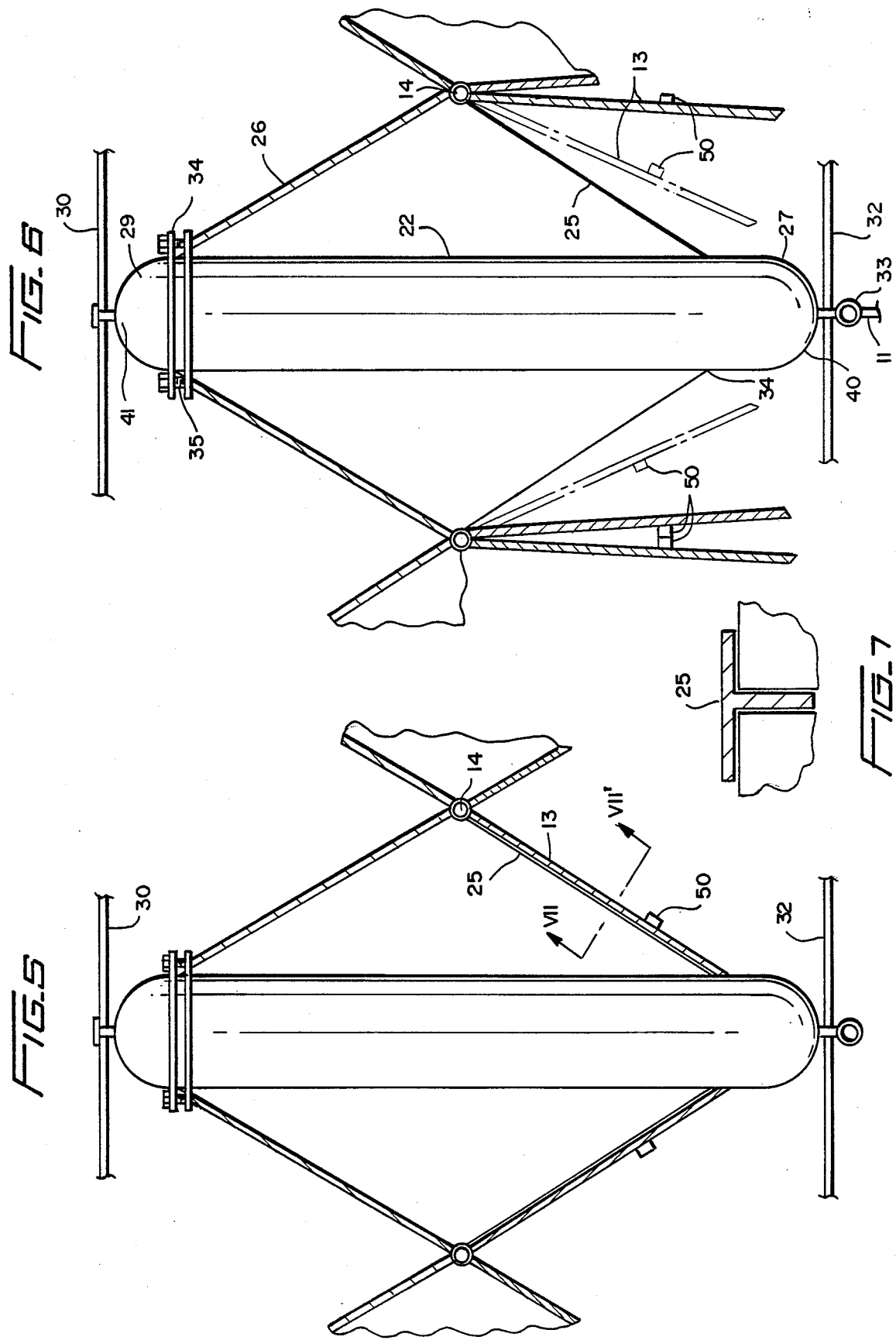

DEVICE FOR LOCAL REDUCTION OF WAVE AMPLITUDE

FIELD OF THE INVENTION

The present invention relates to a device for local reduction of wave amplitude in oceans, lakes and other large bodies of water.

BACKGROUND OF THE INVENTION

The use of breakwater systems and other wave damping devices for the protection of shore areas from the damage caused by energy in sea or ocean waves is well-known. Many attempts have been made to stop or decrease beach erosion by reducing wave energy. It is also known to provide protection to man-made structures such as bottom-mounted oil platforms and structural objects in harbors from the damage caused by ocean waves.

Waves are generated at sea or lakes by virtue of the frictional drag exerted on the water surface by winds. It has been determined that the waves consist of water predominantly in vertical motion with little transverse motion in the direction of wave propagation. The individual particles move in a vertical plane orthogonal to the direction of wave propagation in a circular or substantially elliptical path. The particle orbit decreases in amplitude with an increase in the distance of the particle from the water surface. Thus, a particle at the surface traces an orbit whose vertical amplitude equals the vertical distance between the crest and trough of a wave traversing that point while others removed a distance from the surface experience lesser excursions.

Various devices are known in the prior art which are designed to obtain some reduction of wave amplitude.

For example, U.S. Pat. No. 3,011,316 discloses a breakwater device including flapper plates oriented vertically and protruding above the water surface. This device is rigidly implanted in the bottom near a beach to reduce its erosion and primarily affects the horizontal component of the elliptical water particle motion and does not appear to provide effective damping of deep water waves.

U.S. Pat. No. 4,006,598 to Hulsemann, discloses another example of a breakwater system for protection of the shore area and damping of incoming wave action. The system is designed to act beneath the air-water interface at the base of incoming waves to reduce the height of the wave. The system includes a plate-like structure designed to essentially "raise" the bottom, causing the waves to break farther off the beach than they would otherwise. The water passes vertically though the network of plates and is impeded equally in both the upward and downward directions.

U.S. Pat. No. 4,130,994 suggests another device primarily intended for shallow water surf zones. This device includes a large number of vertically-oriented strings of buoyant discs moored to the bottom of the sea. The major disadvantage is that the likelihood of entanglement of adjacent strings is so great as to render the device inoperable in high seas. In addition, since the mass of water attained varies as the cube of the radius of the disc, the device is far less effective than a single larger plate provided to effect the amplitude of the waves.

U.S Pat. Nos. 3,986,471 and 3,218,809 disclose devices which include a floating or surface-following struture from which negatively buoyant braking elements are suspended. The braking element is a flapper valve which opens to permit water flow in an upward direction only and provide a damping amplitude action only for water attempting to flow in a downward direction relative to the damping plate.

The above-disclosed prior art devices do not provide effective reduction of high amplitude waves and are not particularly suitable for use at deep ocean locations. For example, experiments have shown that the devices located within the air-sea interface suffer greatly from damage when exposed to high seas.

The available means to mitigate the large wave effect on various man-made structures, such as drilling platforms, and to protect such structures from the damaging effect, of the waves by building floating platforms which rise and fall a small percentage of the wave height (semi-submersible) is difficult and expensive. The present invention provides a device which overcomes disadvantages of the prior art.

SUMMARY OF THE INVENTION

It is a primary object of the present invention to provide a simple and efficient device for locally reducing the amplitude of waves in the ocean and other large bodies of water.

It is also an object of the present invention to provide a device which is relatively inexpensive to manufacture, versatile, easy to assemble and disassemble and convenient to transport.

The inventors have discovered that the use of a wave amplitude reduction device located as far as possible into the active wave motion at an optimum depth without exposure to the air-water interface at the surface of the sea provides the most effective reduction of wave amplitude.

The inventors have also discovered that the provision of a large plate-like structure designed to allow substantially unimpeded flow of the water downwardly but not upwardly provides very effective damping results. When the wave crest passes over the device, the water passes freely downwardly and continues until the trough arrives. At that moment, the water attempts to rise but is prevented by the upwardly closing structure of the device. In effect, the normal sinusoidal movement of the water particles is interrupted and the water is caused to flow substantially horizontally beneath the plate.

Such interruption of the sinusoidal nature of the wave results in a significant reduction of wave amplitude. Being positioned just below the trough elevation of the largest expected wave, the plate is effective to attenuate high waves more than waves of lesser height. Although all waves are affected, those causing the most damage to a protected structure or area are reduced to a larger percentage of their amplitude than smaller waves.

The present inventive device is based on a one-way flapper-type valve mechanism function wherein the valves are so arranged that water flowing through them will not tend to produce significant motion of the device.

The above advantages and objects of the present invention are achieved by the structure of the device including a grid plate member adapted to be supported in the sea at a predetermined depth ensuring that the grid plate member remains submerged below the trough of the highest wave expected to be encountered in use of the wave reduction device. The grid plate member includes a plurality of interconnected elongate supporting members. At least some of the supporting members hingedly support flapper valve plates which are operable between substantially opened and closed positions. Each flapper valve in its open position permits sea water to flow substantially unimpeded through the flapper valve and in its closed position substantially blocking the flow of sea water through the flapper valve.

Means are provided on each flapper valve to operate it to its opened position in response to a vertically downward movement of the water as the wave amplitude decreases, and to its closed position in response to a vertically upward movement of the sea water as the wave amplitude increases.

The device includes means which provide positive buoyancy to the grid plate member. Anchoring means are provided on the sea bottom and means connected between the anchoring means and the grid plate member maintain the grid plate member at the predetermined depth below the trough of the largest expect wave.

The lightweight but durable structure of the present inventive device, consisting of multimodule configuration, is very convenient and easily relocated. The simple structure allows for easy and quick assembly and disassembly of the device in the ocean.

The present invention will now be described in more detail with reference being made to the accompanying drawings wherein:

BRIEF DESCRIPTION OF THE DRAWINGS

FIG. 5 shows a cross-sectional view taken along line V—V' in FIG. 2 with the valve means in a fully closed position;

FIG. 6 is a view similar to that shown in FIG. 5 with valve means in fully open and partially opened position;

FIG. 7 shows a structure of restraining means taken along the lines VII—VII' in FIG. 5.

DETAILED DESCRIPTION OF THE PREFERRED EMBODIMENT(S)

Figure 1:
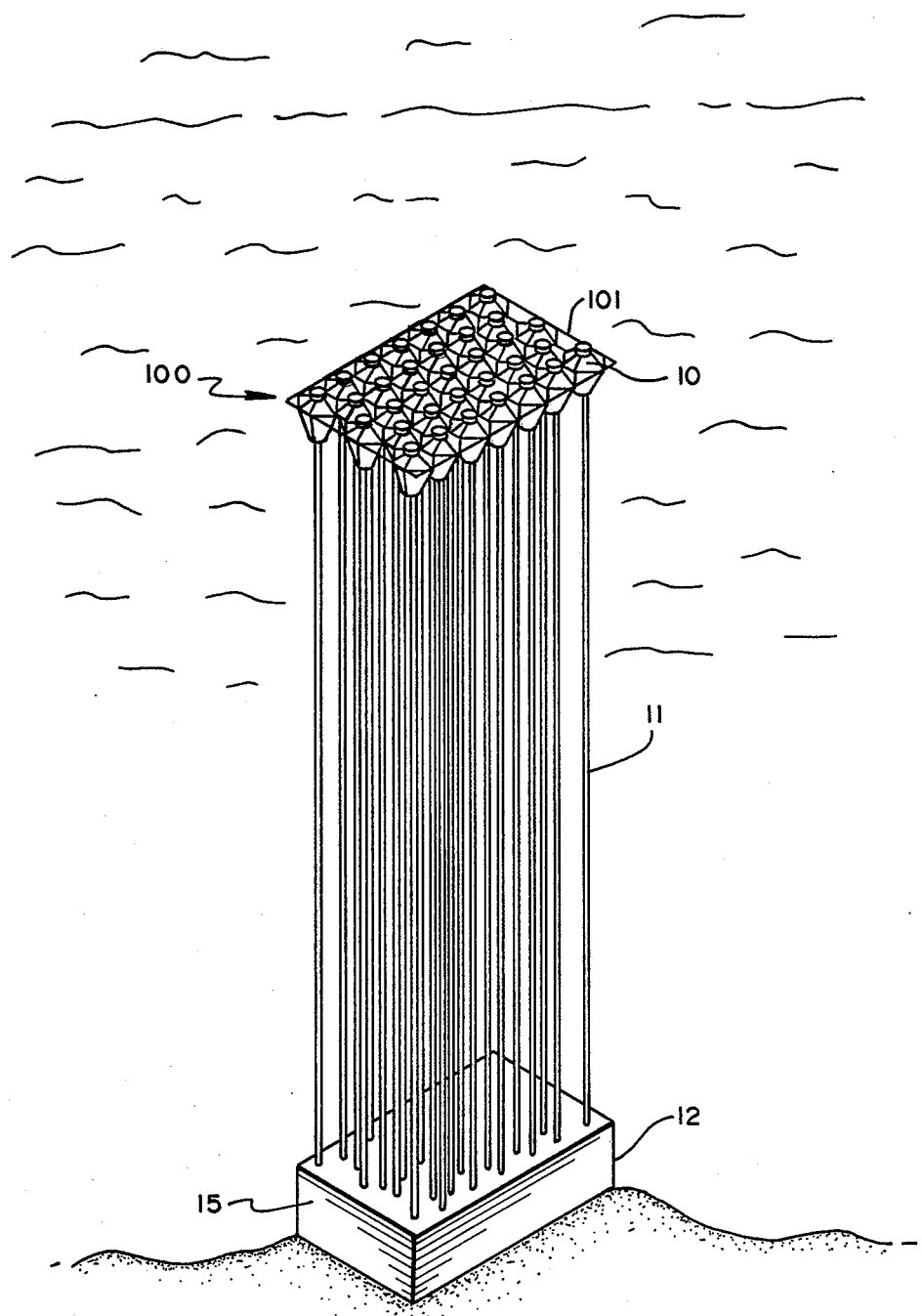
FIG. 1 shows a perspective view of a device for reducing the amplitude of waves, according to the present invention, positioned at the bottom of the ocean.

Referring now to the drawings, in FIG. 1, a device for local reduction of wave amplitude in the ocean is shown designated as numeral 100. The device 100 comprises a large grid-like plate 101 formed of a plurality of interconnected modules, each forming a segment of the grid plate 101. The grid plate 101 is positioned in the ocean such as to operate as near to the surface of the water as possible, but without surfacing when exposed to the largest possible wave. Typically, the level of the grid plate may be about 50-60 feet below calm, low tide water level.

Anchoring means 12 is positioned to rest on the bottom of the ocean. The grid plate member 101 is flexibly connected to the anchoring means 12 by tether lines 11 which maintain the grid plate member 101 at the desired level in the ocean. In the preferred embodiment, a plurality of tether lines 11 are provided between the anchoring means 12 and the grid plate member 101 with one tether line 11 extending from each segment (module) 10 of the grid plate member 101. The anchoring means 12 may comprise a heavy mass or a number of heavy masses, preferably a clump of concrete, each defining a floodable clump buoyancy chamber 15.

Such structure facilitates placement of the anchoring means with the buoyancy chambers 15 air filled, such that the clumps are slightly negatively buoyant. Once in place on the sea bottom, the chambers 15 are flooded to provide enough excess negative buoyancy to ensure that they remain in place at the bottom during the most extreme upward pull of the tethers.

Figure 2:
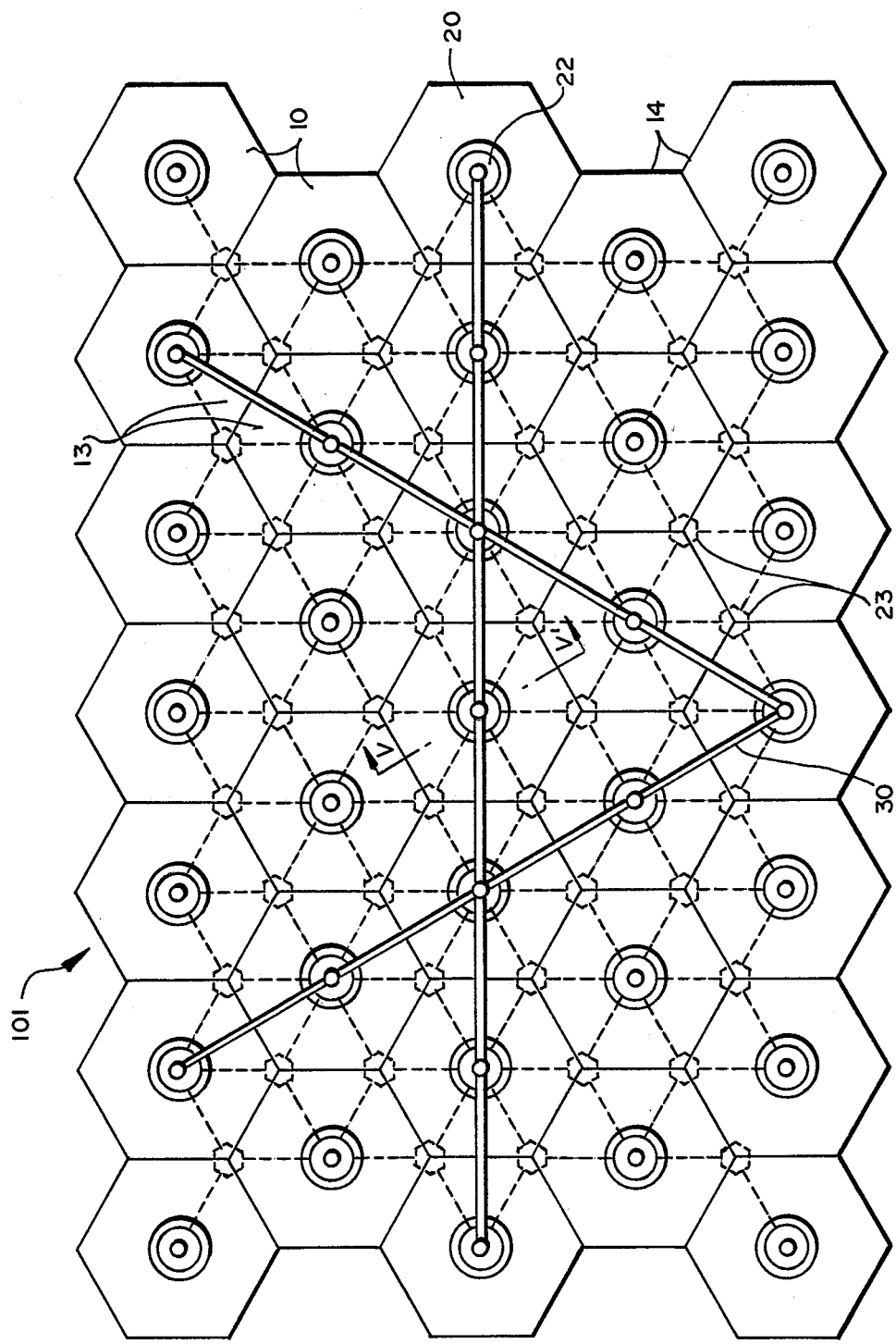
FIG. 2 shows a top view of the grid plate member of the device according to the present invention.

The grid plate member 101 with a plurality of grid segments (modules) 10 is best shown in FIG. 2. Each grid segment 10 is defined by a polygonal frame 20 whose sides are formed by supporting rod members 14. Each segment also includes a plurality of flapper valves 13 each pivotally mounted along an edge on a supporting rod member 14, and has an opposite end movable downwardly between an open and closed position upon its actuation by the movement of the wave.

Figure 8:
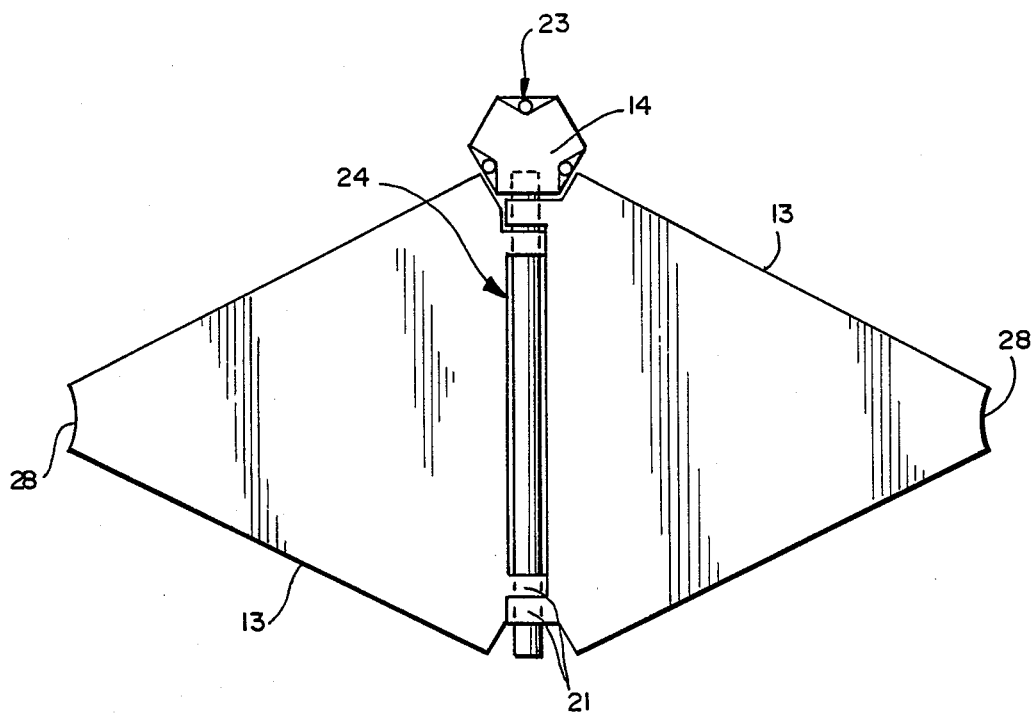
FIG. 8 shows in an enlarged detail two adjacent flapper valves mounted on a common supporting rod member.

In the preferred embodiment, the structural frame defined by the supporting members 14 which supports the valves 13 in each grid segment 10 has a hexagonal configuration. Each supporting member 14 is made of a rigid rod and serves as a hinge pin for a pair of valves in adjoining hexagonal grid segments. The supporting members forming adjacent sides of the hexagonal segments have their ends connected by corner joint clamps 23 as shown in FIG. 8.

Each hexagonal grid segment 10 may have centered therein, a cylindrically-shaped buoyancy chamber 22 which provides the major portion of the positive buoyancy for the wave amplitude reduction device 100. Although other polygonal shapes can be envisioned, such as squares and equilateral triangles, the hexagonal shape of the grid segments 10 appears to offer the best solution in combining the minimum hydrodynamic drag when the flapper valves 13 are opened with maximum buoyancy for the least amount of structural material.

Figure 3:
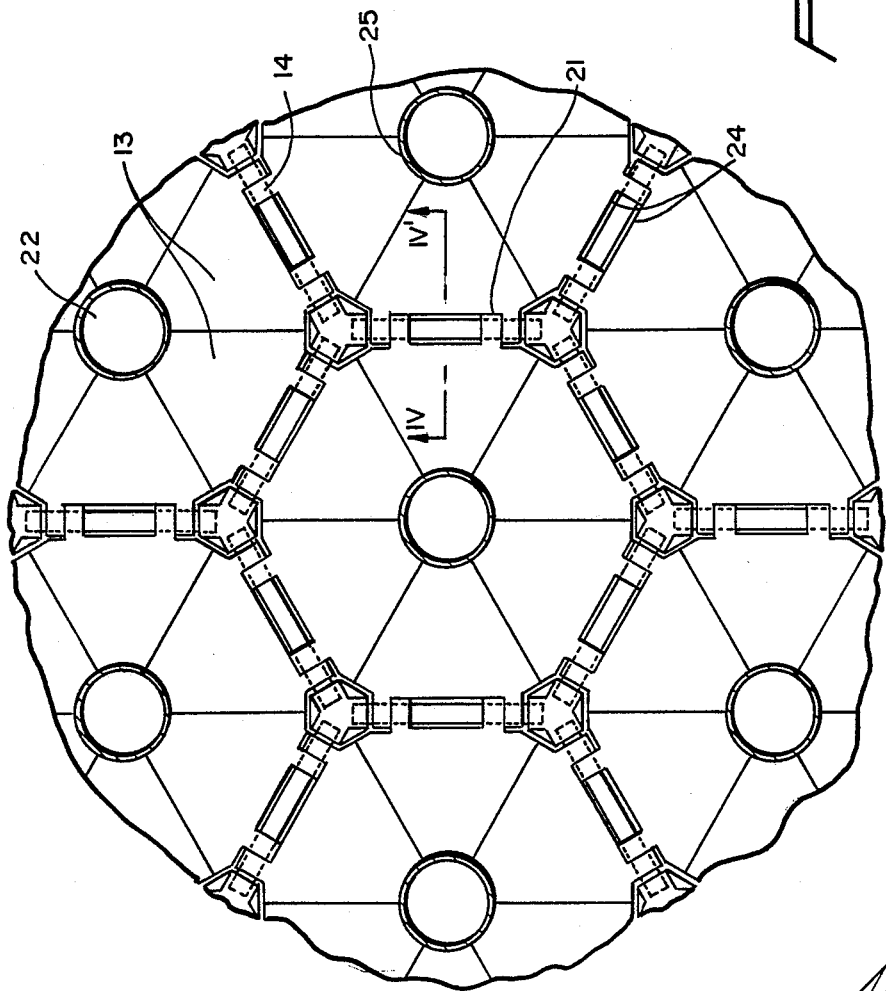
FIG. 3 shows an enlarged, detailed view of a segment of the grid plate with flapper valve means.
Figure 4:
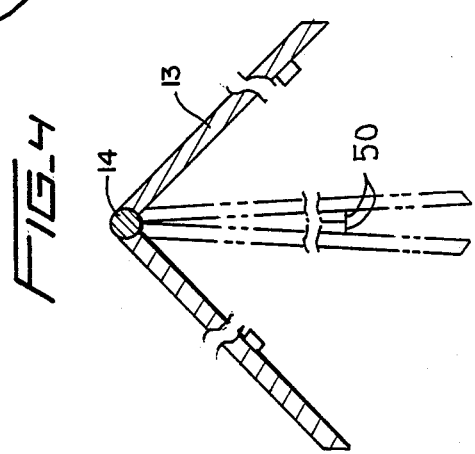
FIG. 4 shows a cross-section of the valve supporting means taken along the lines IV—IV' in FIG. 3.

In the preferred embodiment, the flapper valves 13 are substantially triangular in shape. As best shown in FIG. 3, each of the flapper valves 13 has a base part 24 of the triangle hinged to the supporting rod member 14 forming the side of the hexagonal segment. The supporting rod members 14 of the hexagon form hinge pins for back-to-back flapper valves 13 in adjacent hexagonal segments 10.

The opposite end 28 of each triangular flapper valve 13 has a cutaway portion where it contacts the buoyancy chamber 22 to allow for a close fit thereto.

The flapper valves 13 are constructed of a material being slightly positively buoyant in sea water such that they tend to remain closed in calm water. In the preferred embodiment, the flapper valves are made of a structural foam. The hinge loops 21 connected to the flapper valves which allow their mounting on the supporting rods are split to facilitate replacement in the event of damage or wear.

The corner joint clamps 23 for the hexagonal supporting frames 20 of the grid segments 10 are best shown in FIGS. 3 and 8. In this preferred embodiment, the joint clamp 23 shown in FIG. 8 is split and bolted together such as to grip and firmly clamp by nuts and bolts the legs of adjacent hinge pins of the supporting frame. The corner joint clamps 23 also serve as termination points for the tension members 25,26 which extend upwardly and downwardly towards buoyancy chambers 22 as shown in FIGS. 5 and 6.

FIGS. 5 and 6 show, in a cross-sectional view, one of the segments 10 of the grid plate member 101 with means for restraining the buoyancy chamber 22 in place. These means for restraining, in the preferred embodiment, include six tension members 25 which extend from the apexes of the hexagonal segments 10 towards the lower portion 27 of each buoyancy chamber 22. The tension members 25 serve a dual purpose of restraining the chambers 22 as well as providing a seating surface for the flapper valve 13 when it is in its closed position.

In addition, six tension members 26 are provided between the apices of hexagonal segments and the upper portion 29 of each buoyancy chamber 22. Such structure is required to provide the structural balance between compression members 22 and 14 and tension members 25 and 26. Tension members 26 can preferrably be either steel cables or rods which terminate in attachment rings 34 encircling the cylindrical chamber 22. The upper attachment ring 34 is movably mounted and free to move axially above a second lower ring which is fixed to the cylindrical chamber 22.

As shown in FIG. 7, the tension members 25 of the restraining means are preferably steel structural straight members substantially T-shaped in a cross-section The movable attachment ring 34 is provided with a number of "jacking" bolts 35, preferably six, providing an easy method for equally tensioning all 12 tension members extending between the supporting members 14 and the buoyancy chamber. Proper tensioning is necessary to centrally position the buoyancy chamber 22 in the hexagonal segment frame 20 and substantially orthogonal to the plane of the hexagonal segment frame. FIGS. 5 and 6, respectively, show the flapper valve 13 in its fully closed position (FIG. 5) and its partially and fully opened position (FIG. 6). Limiting means 50 are provided on the plates of the flapper valves to prevent individual flapper valves from opening beyond their designed fully opened positions to a substantially vertical position; consequently, each flapper valve is readily operated to its closed position in response to vertically upward movement of the sea water.

As shown in FIG. 1, in the preferred embodiment, there is a tether line 11 extending between the anchoring clump 12 and each segment 10 of the grid plate member 101. The tether lines 11 are attached to the lower ends 27 of the buoyancy chambers 22 which include a tether termination point 33 affixed thereto, preferably by welding.

The large number of tether lines used for the present invention device, significantly reduces the necessity of providing high rigidity to the supporting frame parts. It is analogous to a suspension bridge where a large number of vertical cables support a roadway which is relatively fragile.

Based on the buoyancy and weight calculations, the preferred material for the buoyancy chamber is steel, and all tension members are made of steel cables, rods or "T" cross-section extrusions.

In addition, a valve device (not shown) may be provided at the bottom and the top 40, 41 of each buoyancy chamber for buoyancy adjustment. Also, as is best shown in FIGS. 2, 5 and 6, additional rigidity can be achieved by provision of first supporting means 30 and second supporting means 32 which extend horizontally above and/or below grid plate member 101 and are formed by plurality of light weight rods. The bottom and the top 40,41 of the buoyancy chamber 22 can be connected to first and second supporting means 30,32 by means of pins located at the uppermost and lowermost extremeties of buoyancy chambers 22.

The following is a description related to the installment of the wave amplitude reduction device according to the present invention. The device can be assembled in a shipyard facility and towed to the emplacement site with the clump buoyancy chambers partially flooded to attain a very slight overall negative buoyancy. The anchoring means may be first positioned on the bottom of the ocean at the location for which reduction of the wave amplitude is deemed.

Once located, the chambers of the anchoring means will be flooded to provide the large negative buoyancy required to hold the device firmly in place. Relocation merely requires blowing or pumping the chamber dr to again attain a slight negative buoyancy facilitating easy movement to the new location.

The assembled grid plate 101, with its buoyancy chambers substantially dry, is towed to and positioned above the previously placed anchor means. While being supported from the surface, the buoyancy chambers of the plate 101 are partially flooded such that the structure is slightly negatively buoyant and sinks or descends in the ocean to the desired depth. Divers then connect a portion of the tether lines. The buoyancy chambers of the plate 101 are then adjusted in buoyancy such that the plate 101 attains a slight overall positive buoyancy, thereby removing all slack from the attached tether lines. Divers then complete attachment of all remaining tether lines. The buoyancy chambers of the plate 101 are then completely blown dry so as to attain their maximum buoyancy. The completed structure 100 is then in place and operational.

At least several tether lines should run at an angle between the anchors to ensure that the buoyancy chambers are retained in the desired location directly above the anchors in the presence of ocean currents. As shown in FIG. 1, in the most preferred embodiment, there is one tether line extending between a clump and each segment of the grid plate member.

The present invention device, in operation, has the grid plate member with active flapper valve elements positioned, for example, in the ocean as near the surface of the water as possible, but without surfacing when exposed to the largest possible wave. The orientation of the flapper valves utilizes a symmetrical valve arrangement. The structure, which consists of a plurality of separate modules (segments) allows for easy mass assembly. Such structure also allows for a very simple and easy transportation between locations of each use. The construction is simple and lightweight. The valves can be made of synthetic foam, buoyant so that they remain closed in calm water. The remaining parts of the construction can be made of light structural steel.

It should be apparent that the above is a description of one preferred embodiment of the invention and that changes can be made, all within the spirit and scope of the invention which is to be constructed in accordance with the attached claims.

We claim:

1. Means for effecting local reduction of sea wave amplitude comprising:

a grid plate member adapted to be supported in the sea at a predetermined depth ensuring that said grid plate member remains submerged below the trough of the highest wave expected to be encountered in use of said wave reduction means, said grid plate member including a plurality of interconnected elongate supporting members;

at least some of said supporting members hingedly supporting flapper valve plates which are operable between respective substantially open and substantially closed positions, each said flapper valve in its said open position permitting sea water to flow substantially unimpeded through the flapper valve and in its said closed position substantially blocking the flow of sea water through the flapper valve;

means effective on each flapper valve to operate it to its open position in response to vertically downward movement of water as the wave amplitude decreases and to its closed position in response to vertically upward movement of the sea water as the wave amplitude increases;

means for providing positive buoyancy to said grid plate member;

anchoring means adapted to be supported on the sea bottom; and means connected between said anchoring means and said grid plate member for maintaining said grid plate member at said predetermined depth.

2. Means according to claim 1, wherein said grid-plate member includes:

a plurality of grid segments, the sides of said segments being defined by interconnected supporting members.

3. Means according to claim 2, wherein said grid segments have a polygonal shape.

4. Means according to claim 3, wherein each of said grid segments includes a plurality of flapper valves, each having one end hingedly mounted on said supporting member and the opposite end freely movable between said opened and closed position.

5. Means according to claim 4, wherein said means for providing a positive buoyancy include a plurality of buoyancy chambers, each mounted centrally in at least some of said grid segments, said chambers being positioned for contact by said free ends of said flapper valves.

6. Means according to claim 1, wherein said grid segments have hexagonal shapes.

7. Means according to claim 5, wherein said flapper valves have a substantially triangular shape.

8. Means according to claim 4, wherein each of said supporting members includes a bar for pivotally supporting two flapper valves of adjacent grid segments.

9. Means according to claim 8, wherein each of said flapper valves is provided with means for inserting said flapper valves onto said bar.

10. Means according to claim 5, wherein said buoyancy chambers are cylindrically shaped.

11. Means according to claim 10, wherein said buoyancy chambers are positioned substantially perpendicular to a horizontal plane of said grid plate member.

12. Means according to claim 11, wherein said flapper valves are made of a structural foam or other buoyant material.

13. Means according to claim 12, wherein said buoyancy chambers are centered within said segments through a plurality of tension members extending between said supporting members defining said frame and the upper and lower portions of said buoyancy chambers.

14. Means according to claim 1, wherein said connecting means includes a plurality of tether lines extending between said anchoring means and at least some of said grid segments.

15. Means according to claim 13, further including a plurality of tether lines extending between said anchoring means and at least some of said grid segments.

16. Means according to claim 15, wherein at least one of said tether lines extends between said anchoring means and a bottom portion of each of said buoyancy chambers.

17. Means according to claim 16, further including a plurality of rods extending between the upper ends of said buoyancy chambers to form a first supporting means.

18. Means according to claim 17, further including a second supporting means defined by a plurality of rods extending between the lower ends of said buoyancy chambers.

* * * * *